(12) United States Patent
Fiori

(10) Patent No.: US 10,207,330 B2
(45) Date of Patent: Feb. 19, 2019

(54) TOOL-HOLDING DEVICE FOR A MACHINING TOOL AND METHOD FOR LOCKING A TOOL INTO A TOOL-HOLDER

(71) Applicant: Saturnino Fiori Cate S.R.L., Turin (IT)

(72) Inventor: Saturnino Fiori, Turin (IT)

(73) Assignee: SATURNINO FIORI CATE SRL, Turin (IT)

( * ) Notice: Subject to any disclaimer, the term of this patent is extended or adjusted under 35 U.S.C. 154(b) by 245 days.

(21) Appl. No.: 15/113,471

(22) PCT Filed: Jan. 22, 2015

(86) PCT No.: PCT/IB2015/050495
§ 371 (c)(1),
(2) Date: Jul. 22, 2016

(87) PCT Pub. No.: WO2015/110985
PCT Pub. Date: Jul. 30, 2015

(65) Prior Publication Data
US 2017/0028478 A1    Feb. 2, 2017

(30) Foreign Application Priority Data

Jan. 22, 2014   (IT) .............................. TO2014A0043

(51) Int. Cl.
*B23B 29/14*      (2006.01)
*B23B 29/04*      (2006.01)
*B23B 27/16*      (2006.01)

(52) U.S. Cl.
CPC ........ *B23B 29/046* (2013.01); *B23B 27/1611* (2013.01); *B23B 27/1651* (2013.01);
(Continued)

(58) Field of Classification Search
CPC ... B23B 29/046; B23B 29/14; B23B 27/1611; B23B 2205/02; B23B 2205/12; B23B 2210/08; B23B 2260/068; B23B 2270/06
See application file for complete search history.

(56) References Cited

U.S. PATENT DOCUMENTS 1,355,902 A    10/1920   Fuller
4,714,384 A *  12/1987   Lagerberg ........... B23B 27/1611
                                                  407/103
(Continued)

FOREIGN PATENT DOCUMENTS

DE         218850 A1    2/1985
FR        2691657 A1   12/1993
(Continued)

*Primary Examiner* — Alan Snyder
(74) *Attorney, Agent, or Firm* — Howson & Howson LLP

(57) ABSTRACT

Tool-holding device (11) for a machining tool, comprising: a tool-holder body (13); a receiving part (15) defined in the tool-holder body (13); a retaining element (17) provided with a pair of mutually cooperating jaws (17a,17b); a female seat (19) between the jaws for an engaging male portion (21) of a machining tip (23), the jaws (17a,17b) being capable of taking a locking configuration, in which the engaging portion (21) of the tool (23) is firmly locked within the seat (19) of the retaining element (17), and a disengaged configuration in which the engaging portion (21) of the tip (23) can be detached from the retaining element (17); a moveable component (25) which bear the main load of holding the retaining element (17) in the receiving part (15) when the retaining element (17) is in the configuration in which it engages the tool (23).

16 Claims, 12 Drawing Sheets

(52) U.S. Cl.
CPC ....... *B23B 2205/02* (2013.01); *B23B 2205/12* (2013.01); *B23B 2210/08* (2013.01); *B23B 2226/125* (2013.01); *B23B 2226/315* (2013.01); *B23B 2270/06* (2013.01)

(56) References Cited

U.S. PATENT DOCUMENTS

| | | |
|---|---|---|
| 5,846,032 A | 12/1998 | Murakami |
| 6,457,914 B1 | 10/2002 | Andras et al. |
| 9,242,299 B2 * | 1/2016 | Taylor .................. B23B 27/145 |
| 2004/0228694 A1 | 11/2004 | Webb et al. |
| 2009/0022553 A1 | 1/2009 | Morrison et al. |
| 2013/0216320 A1 | 8/2013 | Baca, Jr. et al. |

FOREIGN PATENT DOCUMENTS

| | | |
|---|---|---|
| FR | 2706339 A3 | 12/1994 |
| GB | 636772 | 5/1950 |
| JP | 2004-042157 A | 2/2004 |
| WO | 2009/047166 A1 | 4/2009 |

\* cited by examiner

TOOL-HOLDING DEVICE FOR A MACHINING TOOL AND METHOD FOR LOCKING A TOOL INTO A TOOL-HOLDER

TECHNICAL FIELD

The present invention concerns a tool-holding device for a machining tool. The invention further refers to a method for locking a tool into such device. The tool housed in the device is capable of machining of the kind employing chip removal or of surface treatment such as, for instance, lapping or similar operations. The device according to the invention is suitable for machining both outer surfaces and inner surfaces, for example for carrying out boring operations.

PRIOR ART

For removing material from a block or bar of whatever material, for example steel, aluminum, bronze, plastics etc. in order to manufacture an object in accordance with a specific design, machining tools equipped with cutting edges are currently used. The most widespread tools of this kind are presently classified according to ISO norms.

The tool, commonly identified also as insert, is mounted on a supporting body named tool-holder usually having an elongated shape. The supporting body consists of a body of solid material, usually steel, sometimes hard metal, but it can also be made of other materials suitable for the purpose.

The insert is composed of a base, usually made of hard metal, on which a so-called "tip seat" is provided. A tip made of a material suitable for the machining for which the tool is intended is permanently fixed, by braze-welding, in the tip seat. Such tips are usually equipped with one or more cutting edge(s) formed by the transition between the upper surfaces or rake faces of the tip and its lateral surfaces or incidence faces. The tip can for instance be made of a so-called "Super Hard Material" (SHM). Known SHM materials are for example "Cubic Boron Nitride" (CBN) or "Polycrystal Diamond" (PCD). Examples of tools of the aforementioned kind are known from US 2013216320, US 2009022553, WO 0216065 and U.S. Pat. No. 1,355,902.

Braze-welding connects the tip to the base, usually made of hard metal, with sufficient strength. Once the tip has completed its useful life the insert, consisting of the hard metal base, the binder of braze-welding and the SHM tip itself, must be removed for disposal or recycling. Manufacturing of the hard metal base involves complex working processes and high costs. It is indeed necessary to produce an appropriate mold and provide for molding, sintering, flattening and brazing operations for the tip as well as sharpening operations for the peripheral surfaces. These operations must be repeated for each kind of insert and it is clear that the costs deriving therefrom are high.

US 2004/0228694 refers to a known system providing a retaining element intended for the tip and provided with two jaws. The jaws are mutually connected at an end in the region of an elastic portion and have a tip seat at the opposite end. The tip must be inserted into the seat by a movement along a direction perpendicular to the bases of the retaining element. This solution has the advantage of allowing replacement of the worn tip while maintaining the retaining element. However, the shape of the tip and of the seat compels to effect the insertion in a perpendicular direction and this brings about a series of drawbacks. Indeed, if the elastic restoring force of the elastic portion is excessive, the insertion becomes substantially impossible unless an instrument for spreading apart the jaws is used, which, however, makes the operation uncomfortable. If, instead, the elastic force is too weak, the tip can slip out of the seat and must therefore be held manually until the mounting of the retaining element on the tool-holder is completed.

It is a main object of the invention to provide a solution to the problem of how to allow replacement of the tip while maintaining the retaining element without the drawbacks of the prior art. It is another object of the invention to provide a solution to the aforesaid problem that makes easier the operations of mounting the tip into the retaining element. It is a further object of the invention to provide a solution to the aforesaid problem that has large-scale industrial applicability.

SUMMARY OF THE INVENTION

These and other objects are achieved by the device and method as claimed in the appended claims.

According to the invention, the tip is firmly locked in the device by means of a retaining element provided with mutually cooperating jaws. According to the invention, preferably, the tip is entirely made of a material suitable for the machining for which the tool is intended, i.e. mainly "Super Hard Material" (SHM). According to this preferred embodiment of the invention, the tip is therefore the part of the tool that is bound to be worn as a consequence of machining. According to a preferred embodiment of the invention, the tip is locked in a retaining element which closes itself in a pincer-like manner or like a snake's or caiman's mouth against an engaging portion of the tip. According to the invention the retaining element comprises a female seat for the tip. The assembly formed by the combination of retaining element and tip defines a corresponding machining tool in which the tip is replaced when it is worn out, while the retaining element can be re-used several times. The female seat and the tip are shaped so as to allow snap insertion into the configuration of engagement of the tip into the female seat along a direction parallel to the bases of the retaining element. The snap insertion is made possible by the lateral contour of the tip, said contour comprising a pair of narrowed areas provided on the lateral sides and cooperating with a pair of radial projections provided in the jaws in the seat. The snap insertion is brought about by the elastic force exerted onto the jaws by an elastic portion of the retaining element and/or by an elastic element associated to the jaws. This elastic force, along with the special shape of the tip and of the seat, advantageously allows to firmly retain the tip between the jaws before the retaining element is locked into the tool-holder. The risk that the tip slips out of the female seat is therefore avoided and the mounting operation becomes easier and safer. For the same reasons, also detaching the tip from the retaining element is easy. The insertion of the tip into the retaining element is preferably carried out manually, in case by using a tool.

According to a first embodiment of the invention there is provided that the two jaws of the retaining element are resiliently connected to each other at one end. In this first embodiment the retaining element is preferably made of steel, as this is material to which the desired characteristic of elasticity can be conferred. In a second embodiment the jaws are separate bodies held together by an elastic element, for example made of spring steel, comprising for instance a horse-shoe-like, "V"-like or "U"-like bent spring. The elastic end and the spring determine the restoring force for bringing the jaws towards each other thus locking in engagement position the tip into the seat of the retaining element. In this second embodiment the jaws are preferably made of hard metal or other hard material to which no features of elasticity can usually be conferred.

According to the invention, advantageously, the tip that has completed its useful life can be replaced simply by taking the engaging portion of the tip out of the seat provided in the retaining element. A fresh tip can therefore be housed in the seat of the retaining element, which element can advantageously be re-used.

A remarkable saving on costly raw materials such as cobalt and tungsten carbide, as well as on de-oxidant material and brazing alloy used for braze-welding is obtained by means of the invention. Thanks to the device according to the invention, disposal costs are further reduced and the consumption of energy necessary during the production cycle of the tool is reduced. Thanks to the invention the tool is therefore simpler and quicker and less expensive to manufacture, as well as more environment-friendly.

A not least advantage of the invention derives from the fact that the retaining element can be made according to the most widespread standards, for instance ISO standards, and be incorporated in tool-holders having a moveable locking component of a known and standardized kind.

According to the invention the sole element to be replaced when it has completed its useful life is the cutting tip, whereas the locking part or retaining element is re-used a multitude of times. The cutting tip can be made starting from a "blank" of suitable material, or it can be made by sintering or by other manufacturing methods.

BRIEF DESCRIPTION OF THE DRAWINGS

Some preferred embodiments of the invention will be provided by way of non-limiting examples with reference to the annexed drawings, in which.

The same reference numerals have been used in all the figures for distinguishing equal or functionally equivalent components.

DESCRIPTION OF SOME PREFERRED EMBODIMENTS

Figure 1A:
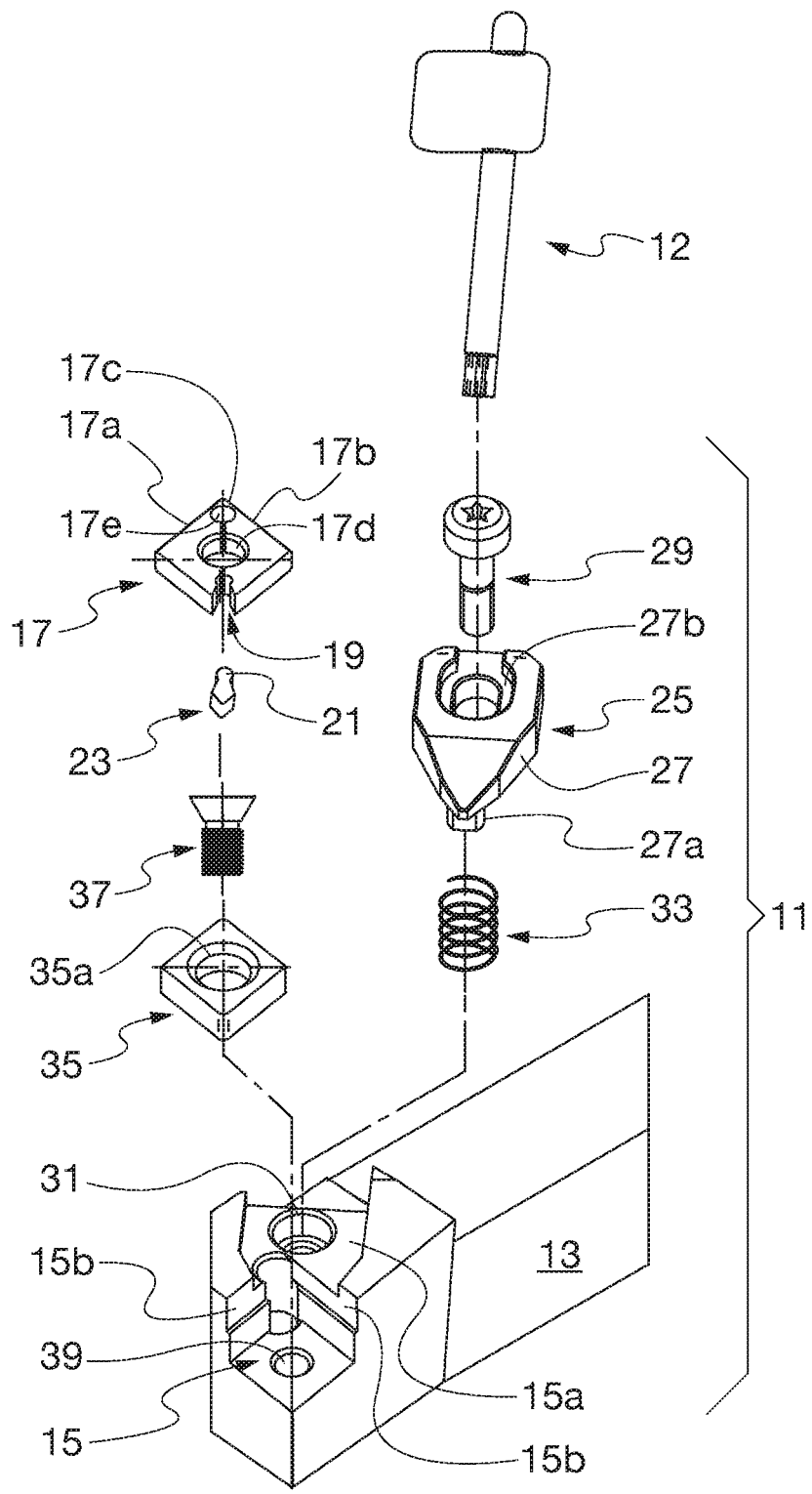
FIG. 1A is an exploded view of a first embodiment of the invention.

Reference is now made to FIG. 1A in order to describe a first embodiment of the invention. FIG. 1A shows an exploded view of the tool-holding device according to a first embodiment of the invention. The tool-holding device has been indicated as a whole with reference numeral 11. In FIG. 1A there is further visible a generic wrench of a known kind for locking the device, said wrench being indicated with reference numeral 12. According to the invention, the device 11 comprises a tool-holder body 13 in which there is defined a receiving part 15 for a machining tool. The receiving part 15 is preferably of a known and standardized kind. According to the invention there is provided a retaining element 17 by which the tool is firmly locked within the receiving part 15. The retaining element 17 is capable of being housed within the receiving part 15 and is provided with substantially parallel opposite bases. According to this first embodiment of the invention, the retaining element 17 is provided with a pair of jaws resiliently connected to one of the ends 17c. A female seat 19 is provided between the jaws 17a,17b, at the end opposite to said elastic connection end. The female seat 19 is capable of receiving a male engaging portion 21 of a tip 23. The remaining part of the tip 23, instead, protrudes from the seat 19 for carrying out the desired machining. The assembly formed by the combination of retaining element 17 and tip 23 defines a corresponding machining tool in which the tip 23 is replaced when it is worn out, while the retaining element 17 can be re-used several times. The female seat 19 is furthermore preferably formed half in one of the jaws and half in the other jaw. The jaws 17a,17b are capable of taking a locking configuration in which the engaging portion 21 of the tip 23 is firmly locked within the seat 19 of the retaining element 17 and a disengaged configuration in which said engaging portion 21 of the tip 23 can be detached from the retaining element 17. FIG. 1 illustrates the disengaged configuration of the retaining element 17, in which the jaws 17a,17b are slightly spread apart. When the retaining element 17 is in this disengaged configuration, the tip 23 can be inserted by snapping into the retaining element with an insertion movement along a direction parallel to the parallel opposite bases of the retaining element 17. The snap insertion, determined by the elastic restoring force of the end 17c as well as by the specific shape of the tip 23 and of the seat 19 advantageously allows to hold the tip 23 within the retaining element 17 before the latter is locked in the receiving part 15. The risk that the tip 23 slips out of the female seat 19 is therefore avoided and the mounting operation becomes easier and safer. In the example shown, the engaging portion 21 has a round shape which facilitates the snap insertion of the tip 23 into the seat 19.

The device 11 further comprises a moveable component 25 which bears the main load of holding the retaining element 17 in said receiving part 15 when the retaining element 17 is in the configuration in which it engages the tip 23. According to the invention the retaining element 17 is preferably fixed to the tool-holder body 13 with the same known means as those used for fixing the base of a conventional tip of the tool-holders currently available on the market. The retaining element 17 will therefore preferably have a shape identical to the one of an insert provided with braze-welded cutting tip according to the prior art. In particular, the retaining element 17 will preferably have a lozenge-like shape and will be provided with a middle bore 17d capable of cooperating with the moveable component 25.

The retaining element 17 is furthermore preferably provided with a second bore 17e, between the middle bore 17d and the connection end 17c. The second bore 17e has the purpose of part of removing part of the material and raising the capacity of elastic return of the connection end 17c.

In this first embodiment, the moveable component 25 comprises an oscillating lever 27. The oscillating lever 27 is provided with a ratchet 27a which is received inside the bore 17d of the retaining element 17 and cooperates with said bore, as will appear more clearly from the ensuing description. The oscillating lever 27 is fixed to the tool-holder body 13 by means of a screw 29. A bore 27b is provided in the oscillating lever 27 for passage of the screw 29. The screw 29 engages into a threaded bore 31 provided in the body 13 in the inside of the receiving part 15. The screw 29 will preferably have a round head with TORX recess. Furthermore, a counter spring 33 will preferably be provided between the lever 27 and the bore 31 for the screw 29. By acting onto the screw 29 by means of an appropriate screw, oscillation of the lever 27 and locking of the retaining element 17 within the receiving part 15 of the tool-holder body 13 are caused. The oscillation of the lever 27 takes place by means of an inclined plane 15a provided in the receiving part 15. Owing to the inclined plane, the lever 27 moves downwards and back towards the rear portion of the receiving part 15. In this way the lever 27 exerts a pressure against the retaining element 17 which is pressed towards the base of the receiving part 15 and simultaneously pulled back towards the inside of said receiving part. The side walls 15b of the receiving part 15 work as sliding surfaces for the flanks of the retaining element. Said side walls are convergent towards the inside of the receiving part 15 for causing closing of the jaws 17a,17b of the retaining element 17, when said element is retracted towards the inside of the receiving part. By actuating the moveable component 25, locking of the male engaging portion 21 within the seat 19 of the retaining element 17 and simultaneously of the retaining element 17 within the receiving part 15 is thus caused.

According to the invention, locking of the engaging portion 21 of the tip 23 within the seat 19 takes place by means of elastic deformation of the opposite end 17c of the retaining element 17, where the jaws 17a,17b are connected to each other. The retaining element 17 is preferably made of steel. The tool or tip 23 can be made of any suitable material. Suitably materials will typically be "Super Hard Material" (SHM) such as "Cubic Boron Nitride" (CBN) or "Polycrystal Diamond" (PCD), super rapid steel "high speed steel" (HSS), hard metal, ceramic, silicon nitride, natural diamond, monocrystalline diamond (MCD), synthetic diamond (CVD). The tool-holder body 13 consists of a solid body, for instance in the form of a bar or shaft. The body 13 is preferably made of steel or hard metal or of steel and hard metal, for instance in the case of boring bars, or of other materials suitable for the purpose.

Between the retaining element 17 and the surface of the base of the receiving part 15 there is provided a sub-plate 35 lying on said base. The sub-plate 35 is made of a wear-resistant material, for instance of hard metal consisting of cobalt-bonded tungsten carbide. The sub-plate 35 is fixed to the tool-holder body 13 within the corresponding receiving part 15 by means suitable for the purpose, preferably by means of a screw 37. The fixing screw 37 of the sub-plate 35 engages into a bore 39 provided in the receiving part 15 of the tool-holder body 13. A bore 35a allows passage of the screw 37 through the sub-plate 35. The bore 39 is arranged in front of the bore 31 in a recessed portion of the receiving part 15.

Figure 1B:
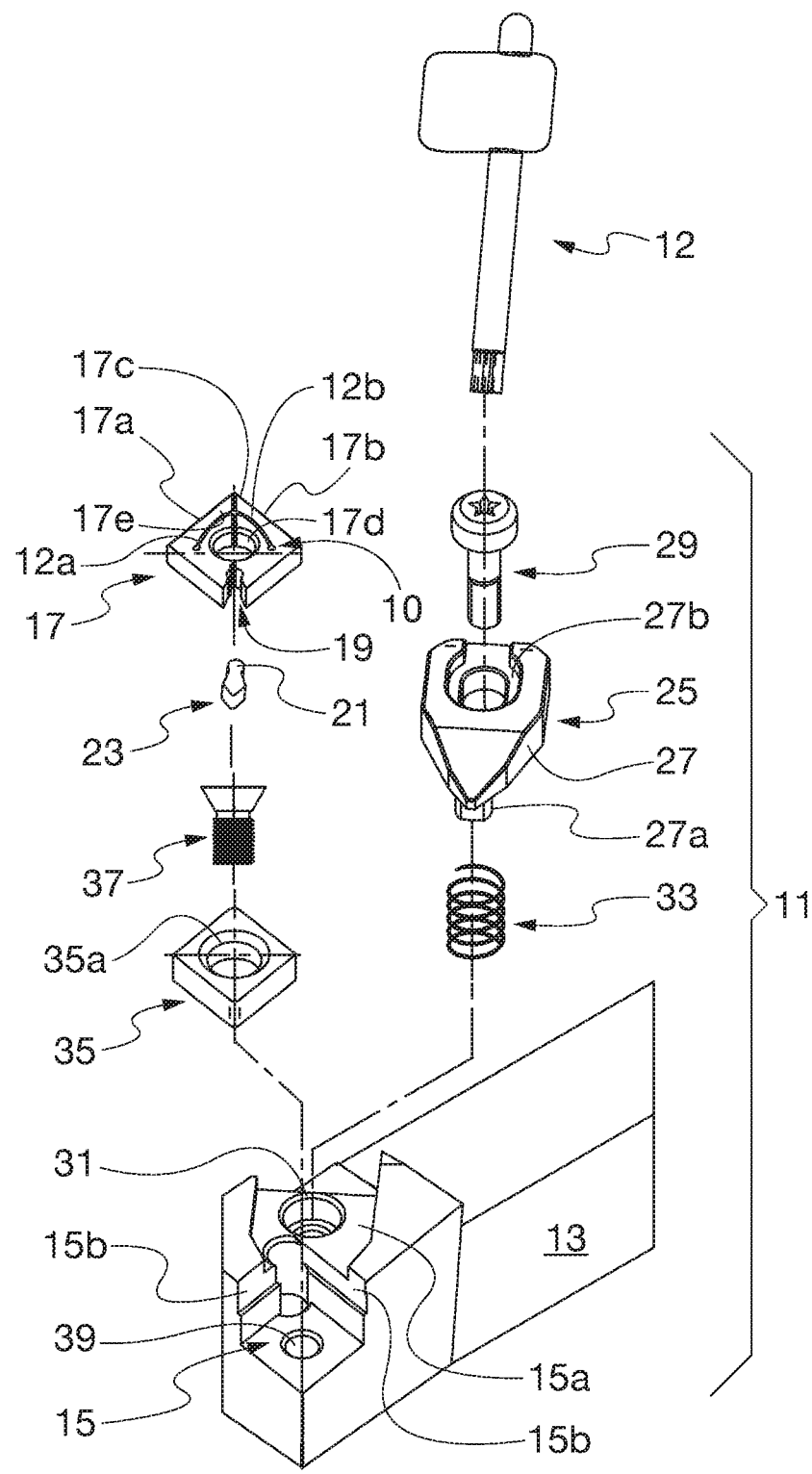
FIG. 1B is an exploded view of a second embodiment of the invention.

With reference to FIG. 1B there is illustrated an exploded view of the device in a second embodiment of the invention equipped with a spring 10. The spring 10 is arranged astride of the jaws 17a,17b and determines the elastic return of the jaws 17a,17b towards each other. In the embodiment shown, the spring 10 is a single piece and has a horse-shoe-like or "V"-like or "U"-like shape and is housed in a seat 12a,12b provided in the jaws 17a,17b. In the embodiment shown, the jaws 17a,17b are separated and held together by the spring 10. However, in another embodiment it will be possible to provide for the jaws 17a,17b to be connected to each other at the end 17c by an elastic portion of the material of which the jaws are made. In this case the spring 10 cooperates with the end 17c for causing the return of the jaws and holding the tip 23 within the seat 19 before the device is mounted. The function and structure of the spring 10 will become clearer from the description thereof provided here below.

Figure 2A:
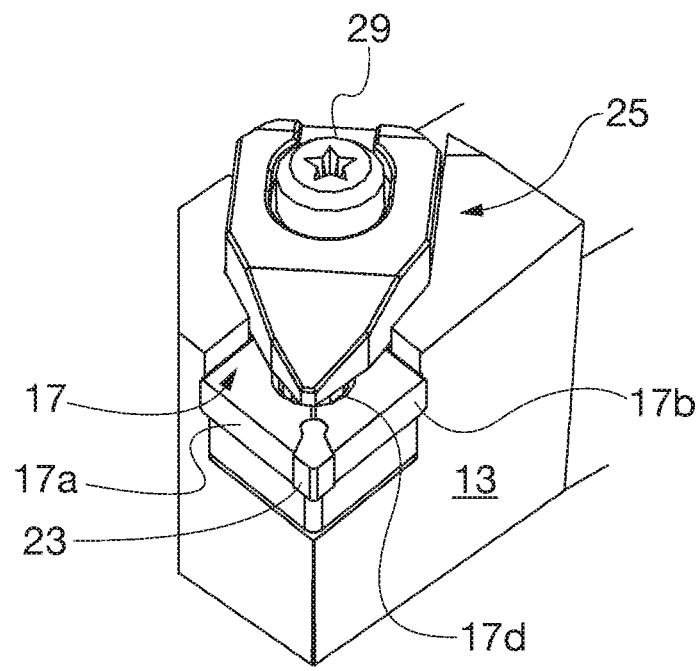
FIG. 2A is a partial perspective view of the device of FIG. 1A when mounted.
Figure 2B:
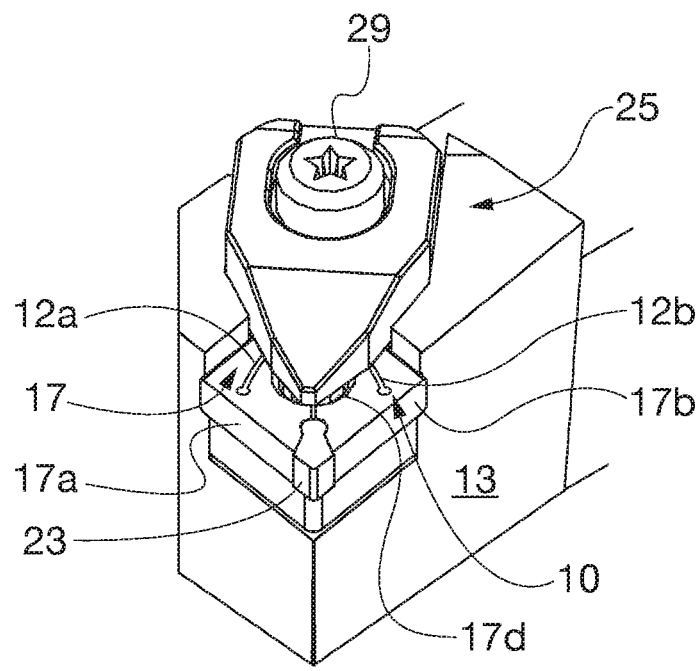
FIG. 2B is a partial perspective view of the device of FIG. 1B when mounted.
Figure 3A:
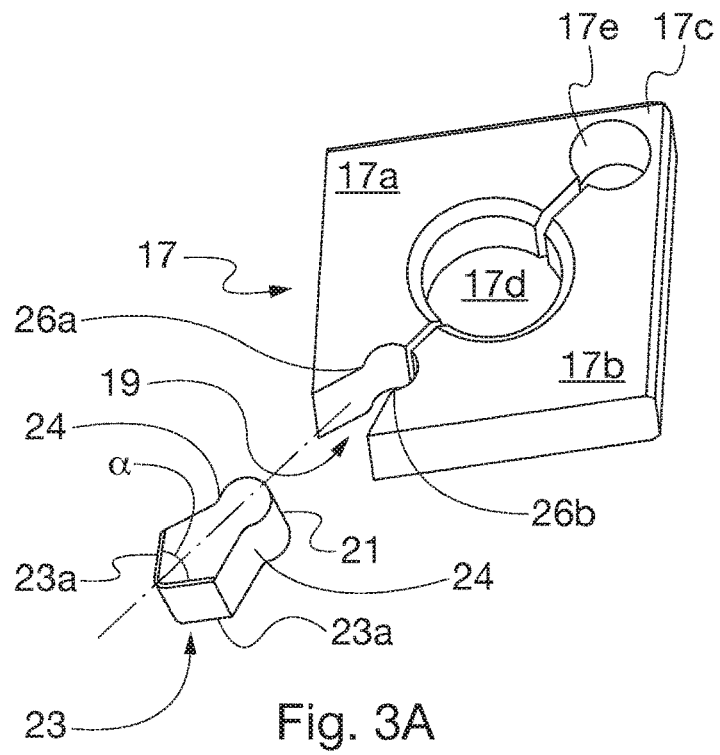
FIG. 3A is an enlarged view of the retaining element and of the tip according to FIG. 1A.

Referring to FIGS. 2A and 2B, there is visible, respectively, the device of FIG. 1A and the device of FIG. 1B, mounted with the jaws 17a,17b in their locking configuration, firmly in contact with the engaging portion of the tip 23. In the case of FIG. 2A the retaining element 17 is a single piece and the tip 23 is held within the seat 19 by the elastic restoring force exerted onto the jaws 17a,17b by the end 17c. In the case of FIG. 2B, instead, the retaining element is in two pieces and the tip 23 is held within the seat 19 by the elastic restoring force exerted onto the jaws 17a,17b by the spring 10. In both cases the retaining element 17 can be maneuvered before being mounted in the device 11 without the risk for the tip 23 to slip out of the seat 19. Referring now to FIG. 3A, there are illustrated in more detail the retaining element 17 and the tip 23 of the embodiment of FIG. 1A. As can be appreciated, the male engaging portion 21 of the tip 23 has a substantially semi-circular cross-section in a plane parallel to the bases of the retaining element 17. In the example shown, the tip 23 as a whole has an asymmetric necktie-like shape and is provided with a pair of cutting edges 23a. The seat 19 has a shape complementary to the shape of the male portion 21 received in the seat 19. The tip 23 can be inserted by snapping into the seat 19 with an insertion movement along a direction parallel to the bases of the retaining element 17. The snap insertion is made possible by the lateral contour of the tip 23, said contour comprising a pair of narrowed areas 24 provided on the lateral sides and cooperating with a pair of radial projections 26a,26b provided in the jaws 17a,17b in the seat 19. The snap insertion, brought about by the elastic force of the end 17c as well as by the specific shape of the tip 23 and of the seat 19, advantageously allows to retain the tip 23 in the retaining element 17 before the latter is locked in the receiving part 15. The risk that the tip 23 slips out of the female seat 19 is therefore avoided and the mounting operation becomes easier and safer.

Figure 3B:
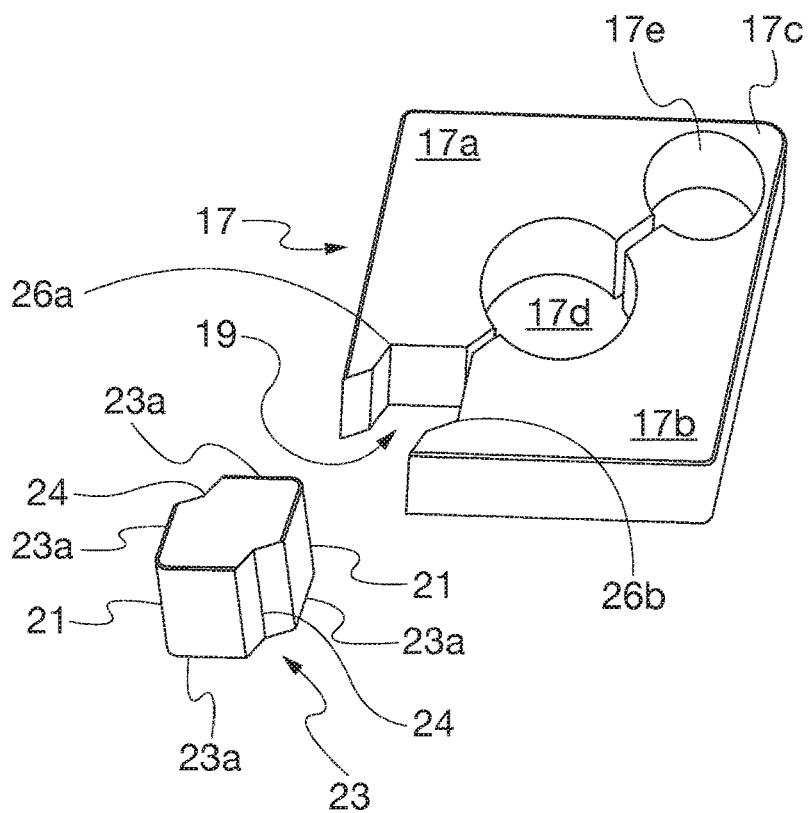
FIG. 3B is an enlarged view of the retaining element and of the tip in a first variant of FIG. 1A.

Referring to FIG. 3B, there is illustrated a first variant of the first embodiment of the invention in which the tip 23 has a symmetric double lozenge-like shape. Each lozenge substantially defines a male engaging portion 21. Advantageously, according to this variant, the tip 23 is preferably provided with four cutting edges 23a and can be mounted so that either pair of cutting edges protrudes from the seat 19. Thanks to this provision, it will therefore be possible to obtain a tip 23 having a substantially doubled useful life, as it will be sufficient to rotate it by 180° degrees in order to use either pair of cutting edges and, correspondingly, either engaging portion 21. According to this variant, too, the seat 19 has a complementary shape in which the engaging portion 21 of the tip 23 represented by either lozenge-like portion is received. According to this variant, too, the insertion of the tip 23 takes place by snapping along a direction parallel to the bases of the retaining element 17. In this case, too, the snap insertion is made possible by the lateral contour of the tip 23, said contour comprising a pair of narrowed areas 24 provided on the lateral sides and cooperating with a pair of radial projections 26a,26b provided in the jaws 17a,17b in the seat 19. The snap insertion, brought about by the elastic force of the end 17c as well as by the specific shape of the tip 23 and of the seat 19, advantageously allows to retain the tip 23 in the retaining element 17 before the latter is locked in the receiving part 15. The risk that the tip 23 slips out of the female seat 19 is therefore avoided and the mounting operation becomes easier and safer.

Figure 3C:
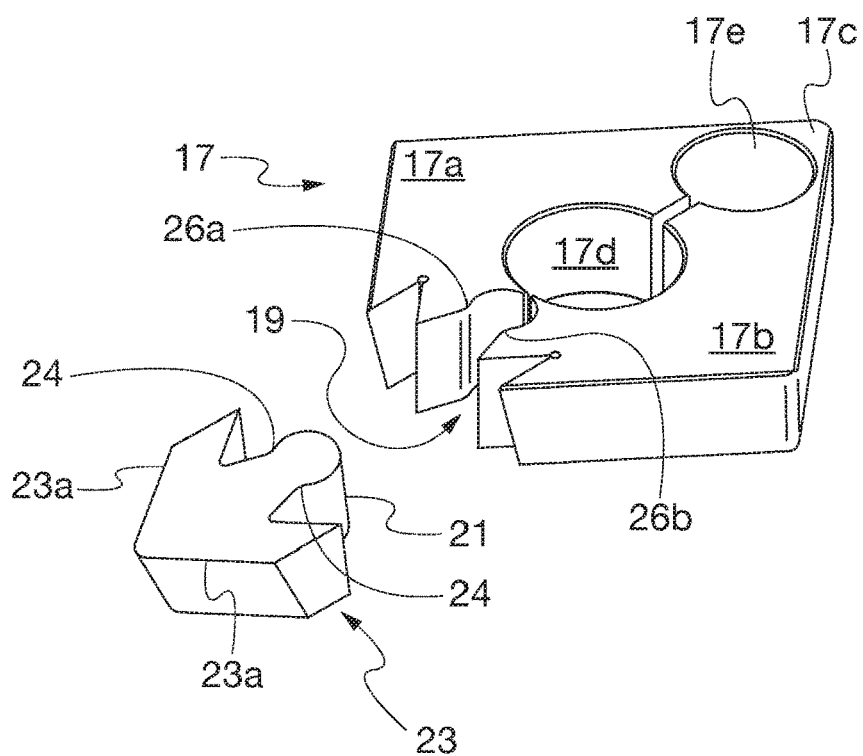
FIG. 3C is an enlarged view of the retaining element and of the tip in a second variant of FIG. 1A.

Referring to FIG. 3C, there is illustrated a second variant of the first embodiment of the invention in which the tip 23 has a substantially anchor-like shape. This configuration is particularly suitable when bodies of aluminum or alloys thereof, non-ferrous metals or plastics or carbon fibers or other materials, for which polycrystalline diamond is deemed to be the most suitable cutting material, are to be worked. The tip 23 in this case has two edges or cutting edges 23a that are longer, because in current practice the pass depths over materials such as light alloys are greater. The seat 19 will have a complementary shape in which the engaging portion 21 of the tip 23 represented by the anchor head is received. According to this variant, too, the insertion of the tip 23 takes place by snapping along a direction parallel to the bases of the retaining element 17. The snap insertion is made possible by the lateral contour of the tip 23, said contour comprising a pair of narrowed areas 24 provided on the lateral sides and cooperating with a pair of radial projections 26a,26b provided in the jaws 17a,17b in the seat 19. The snap insertion, brought about by the elastic force of the end 17c as well as by the specific shape of the tip 23 and of the seat 19, advantageously allows to firmly retain the tip 23 in the retaining element 17 before the latter is locked in the receiving part 15. The risk that the tip 23 slips out of the female seat 19 is therefore avoided and the mounting operation becomes easier and safer.

Figure 3D:
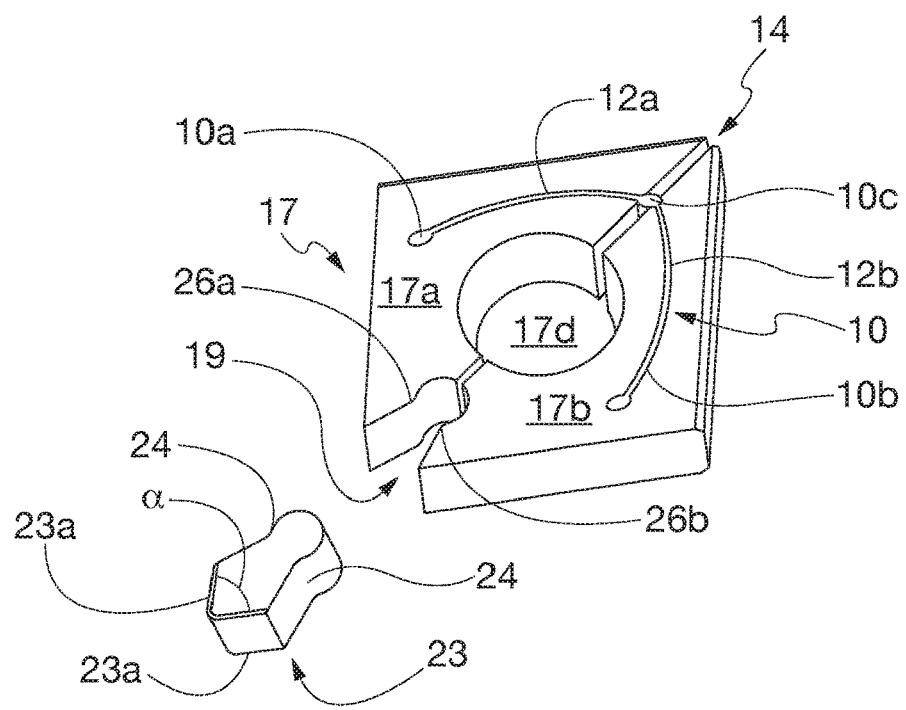
FIG. 3D is an enlarged view of the retaining element and of the tip according to FIG. 1B.
Figure 3E:
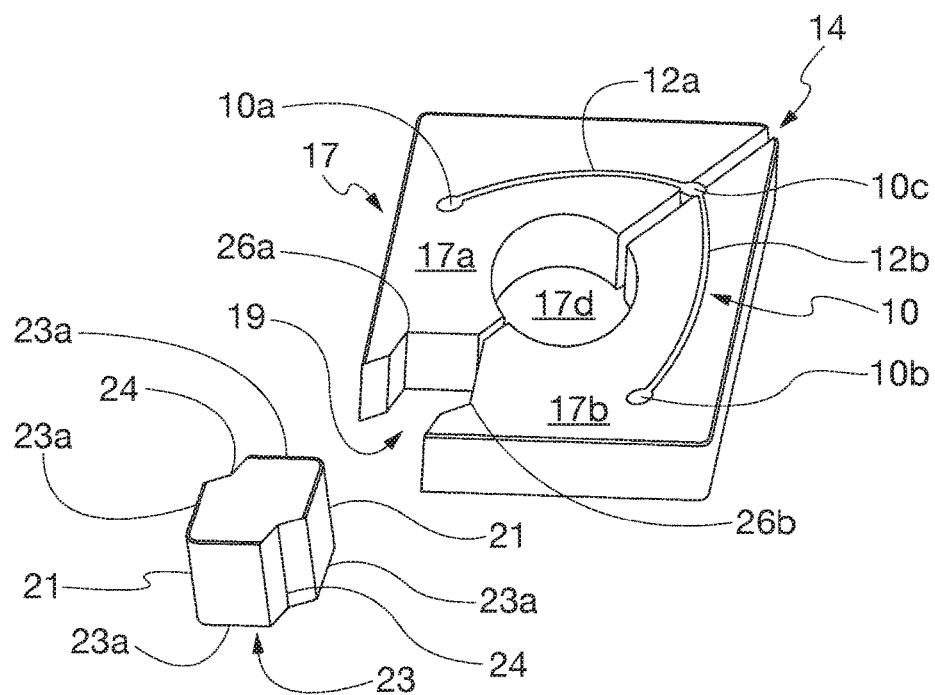
FIG. 3E is an enlarged view of the retaining element and of the tip according to FIG. 1B in accordance with the first variant.
Figure 3F:
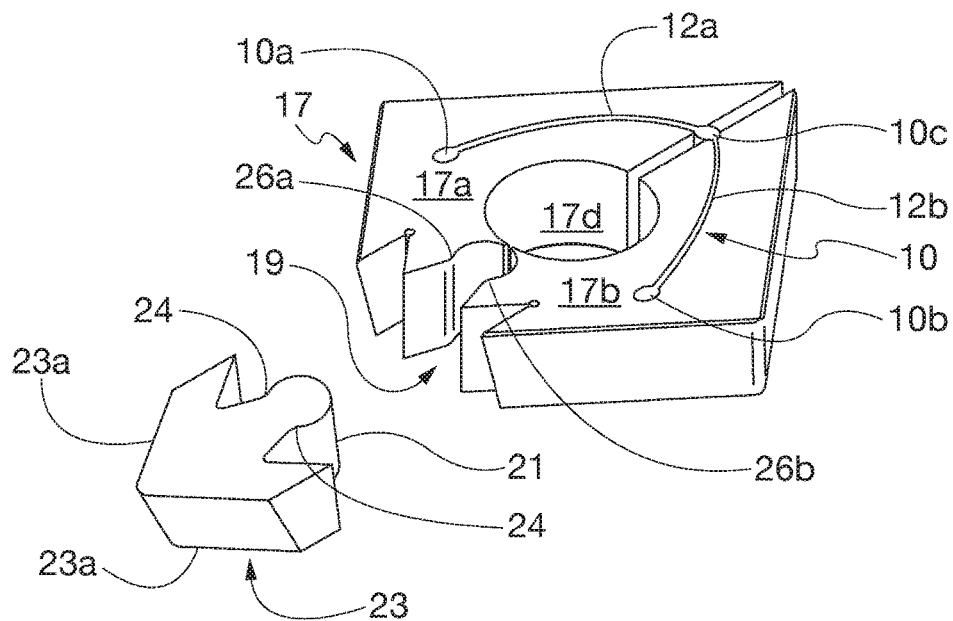
FIG. 3F is an enlarged view of the retaining element and of the tip according to FIG. 1B in accordance with the second variant.

Referring to the FIGS. 3D,3E,3F, there are illustrated in more detail the retaining element 17 and the tip 23 of the embodiment of FIG. 2A in its three variants according to FIGS. 3A,3B,3C. In accordance with the invention, the embodiments shown in FIGS. 3D,3E,3F allow the snap insertion of the tip 23 along a direction parallel to the bases of the retaining element 17. The snap insertion is made possible by the lateral contour of the tip 23, said contour comprising a pair of narrowed areas 24 provided on the lateral sides and cooperating with a pair of radial projections 26a,26b provided in the jaws 17a,17b in the seat 19. The snap insertion, brought about by the elastic force of the spring 10 as well as by the specific shape of the tip 23 and of the seat 19, advantageously allows to retain the tip 23 in the retaining element 17 before the latter is locked in the receiving part 15. The risk that the tip 23 slips out of the female seat 19 is therefore avoided and the mounting operation becomes easier and safer.

Figure 3G:
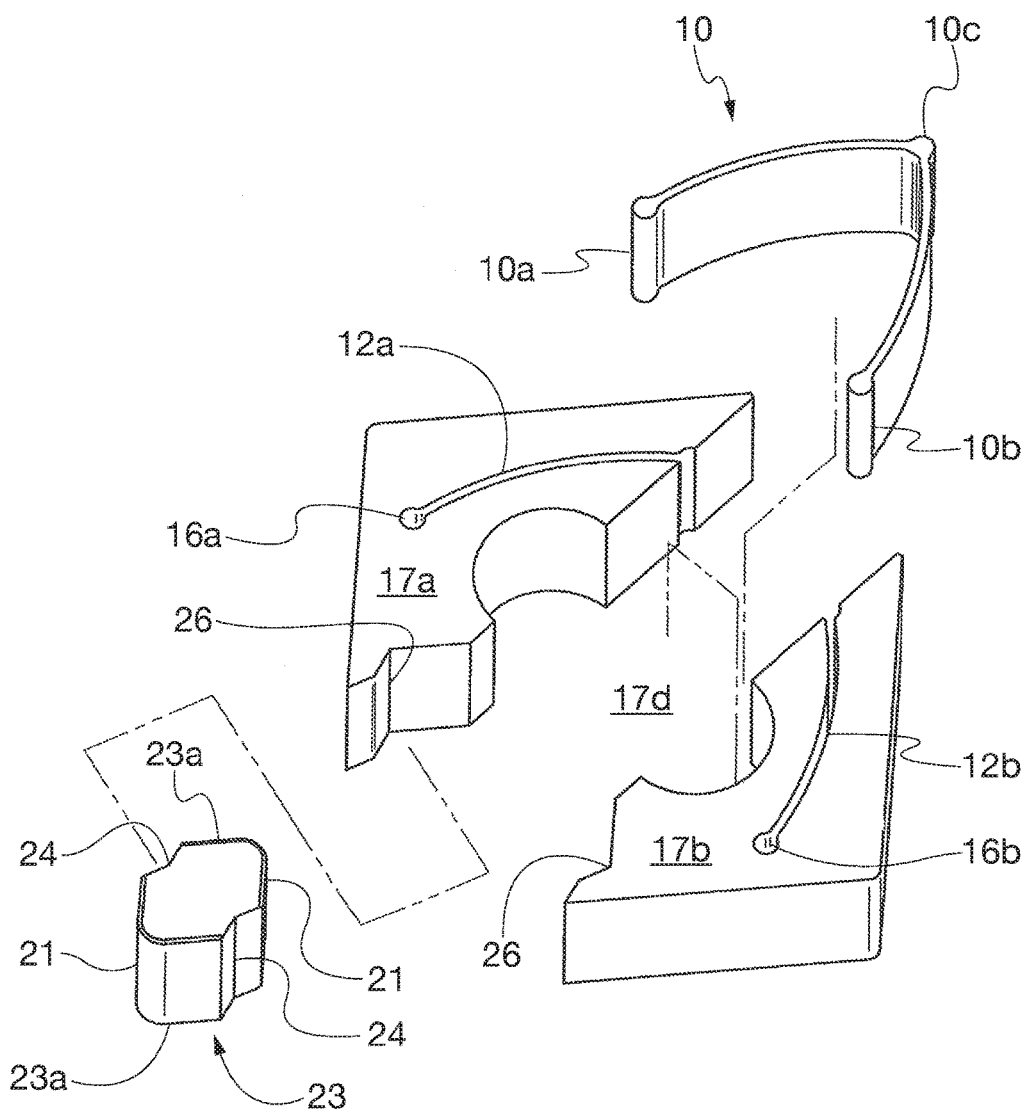
FIG. 3G is an exploded view of the retaining element and of the tip of FIG. 3E.

Referring now to FIG. 3G, there is illustrated in more detail the retaining element 17 according to the second embodiment of the invention provided with the spring 10. The retaining element 17 comprises a pair of jaws 17a,17b provided with corresponding arched seats 12a,12b. The seats 12a,12b preferably comprise corresponding slots passing right through the jaws 17a,17b perpendicularly to the bases of the retaining element 17. The spring 10 has an approximately horse shoe-like or "V"-like shape and is provided with arched elastic strips connected at the base of the "V" in the region of a thickened portion 10c extending transversely. Thickened portions 10a,10b are also provided at the opposite ends of the "V". In the embodiment shown, the thickened portions 10a,10b,10c have a substantially circular cross-section. Correspondingly, the seats 12a,12b comprise widened portions 16a,16b for receiving the thickened portions 10a,10b. The pair of jaws 17a,17b is resiliently held together by the spring 10 inserted in the seat 12,12b and a longitudinal slot 14 oriented along the direction of snap insertion of the tip 23 is defined between the jaws. The spring 10 exerts an elastic restoring force onto the jaws 12a,12b, said force holding together the jaws and the tip 23 when this is within the seat 19, without having to exert further force from the outside. Thanks to this provision, the tip 23 can be inserted into and removed from the retaining element 17 as many times as wished when this is free from the seat 15 in the device 11, along a direction parallel to the bases of the retaining element 17.

Figure 4A:
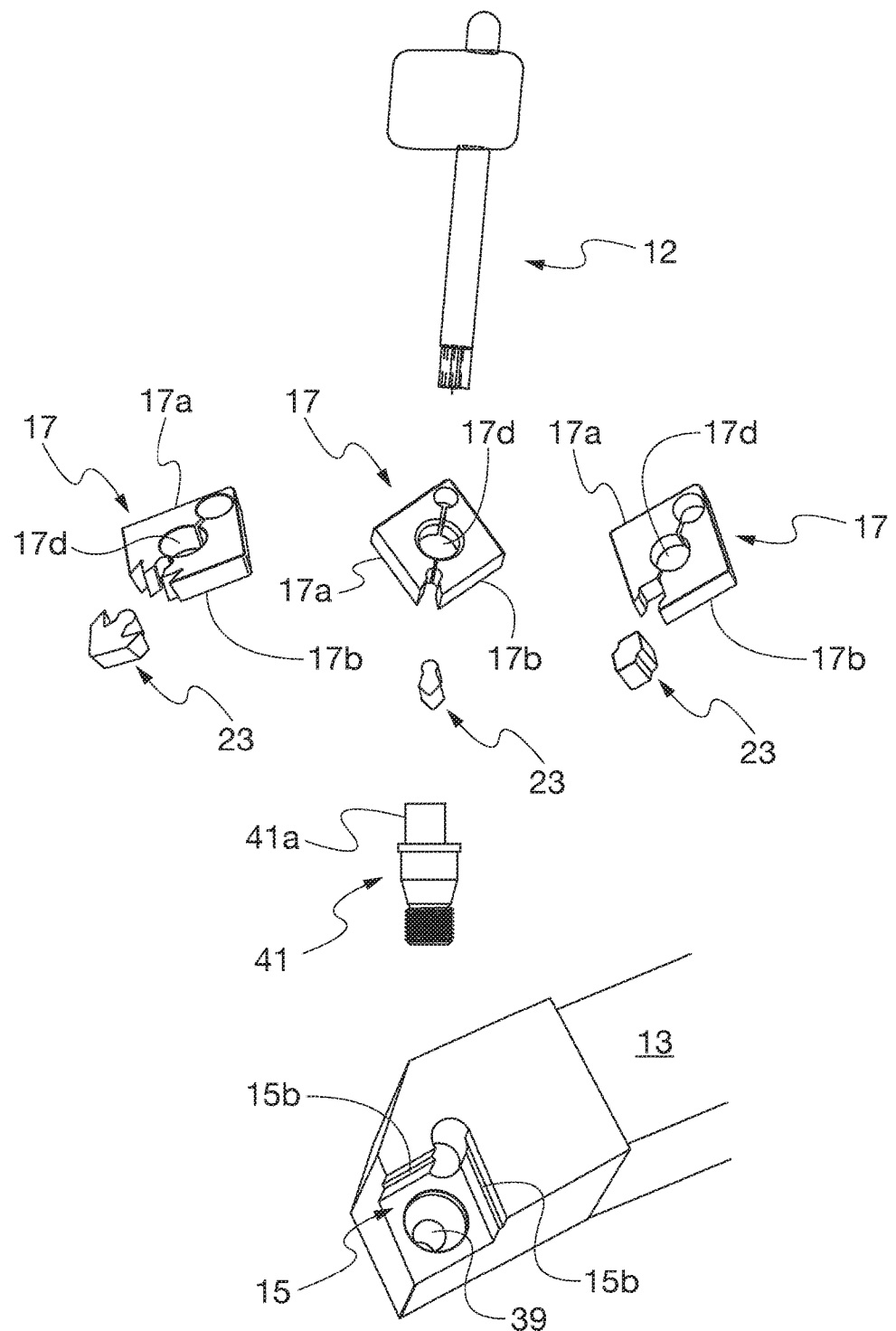
FIG. 4A is an exploded view of the device according to the first embodiment of the invention in its three variants, using a moveable locking component made as an eccentric screw.

Referring to FIG. 4A, there is illustrated an exploded view of the device according to the first embodiment of the invention in its variants, when provided with a moveable locking component made as an eccentric screw rather than as an oscillating lever.

In this embodiment of the invention the retaining element 17 is fixed by means of a cylindrical threaded pin 41. The threaded pin has a slightly eccentric upper part 41a. The pin 41 is engaged in a threaded bore 39 provided in the tool-holder body 13. The eccentric part 41a of the pin 41 engages into a through-bore 17d in the retaining element 17. By rotating the threaded pin 41 the retaining element is brought back towards the inside of the receiving part 15 in the tool-holder body 13. At the same time the pin 41 presses the retaining element 17 against the base of the receiving part 15 or against the sub-plate 35, if present, thus locking both the retaining element 17 and the sub-plate 35 within the receiving part 15 of the tool-holder body 13. The lateral sides 15b of the receiving part 15 simultaneously determine closing of the jaws 17a,17b during the backward movement of the retaining element 17 in the receiving part 15. According to this second embodiment, too, actuating the moveable component 25 causes locking of the engaging male portion 21 within the seat 19 of the retaining element 17 and the simultaneous locking of the retaining element 17 in the receiving part 15.

Still with reference to this second embodiment, for more safety it will be possible to provide, in addition to the threaded pin 41, a lever similar to the one of FIG. 1. In this case the lever has the sole function of pressing the retaining element against the base of the receiving part 15, thus preventing said element from rising and slipping out of the receiving part because of the shear stress. It will further be possible to provide other fixing methods for instance of the kind with countersunk head.

Figure 4B:
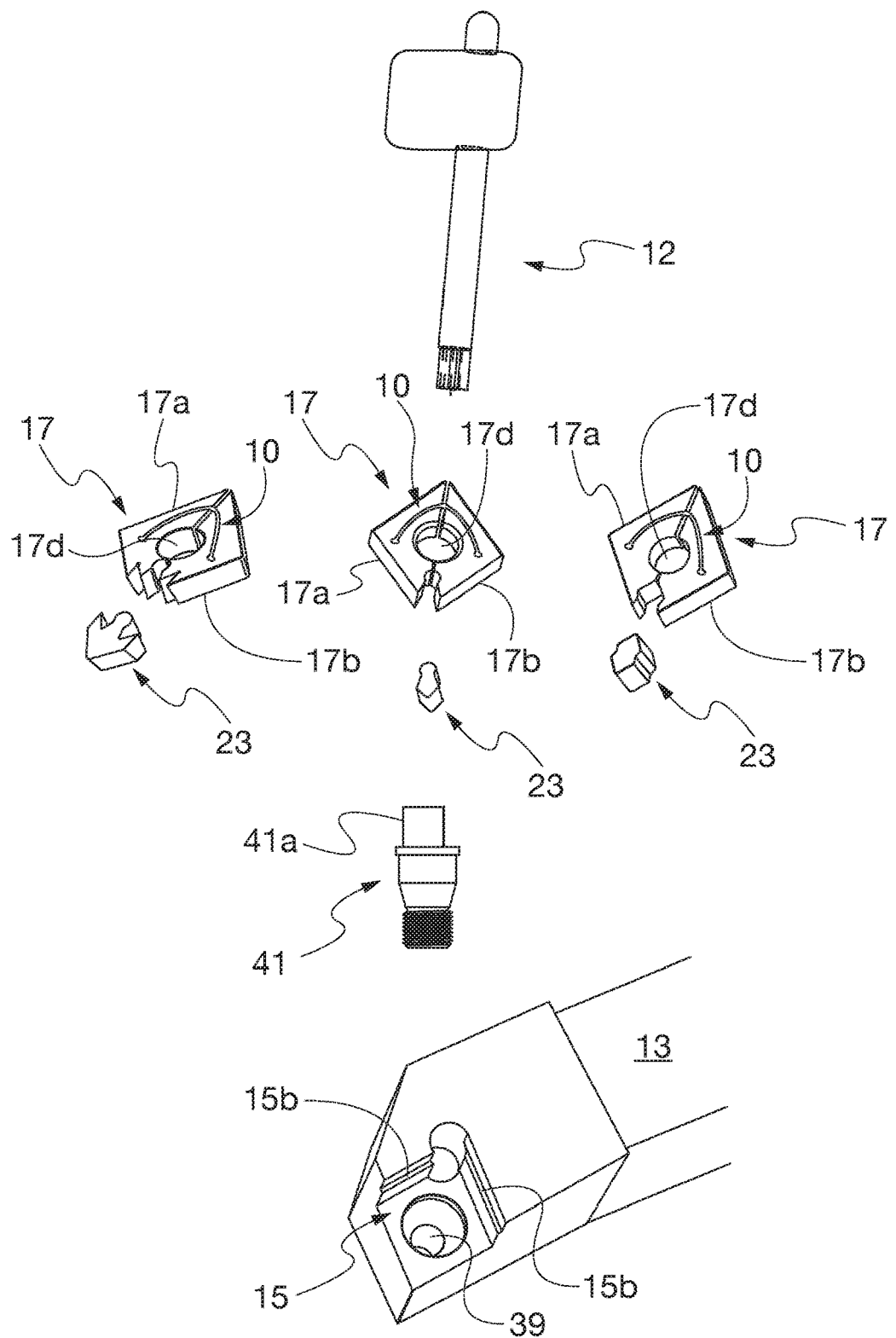
FIG. 4B is an exploded view of the device of the second embodiment of the invention in its three variants, using a moveable locking component made as an eccentric screw.

Referring to FIG. 4B, there is illustrated an exploded view of the device of the second embodiment of the invention in its three variants, when provided with a moveable locking element made as an eccentric screw according to FIG. 4A. The eccentric screw element can therefore be used with the various embodiments of the invention.

Figure 5A:
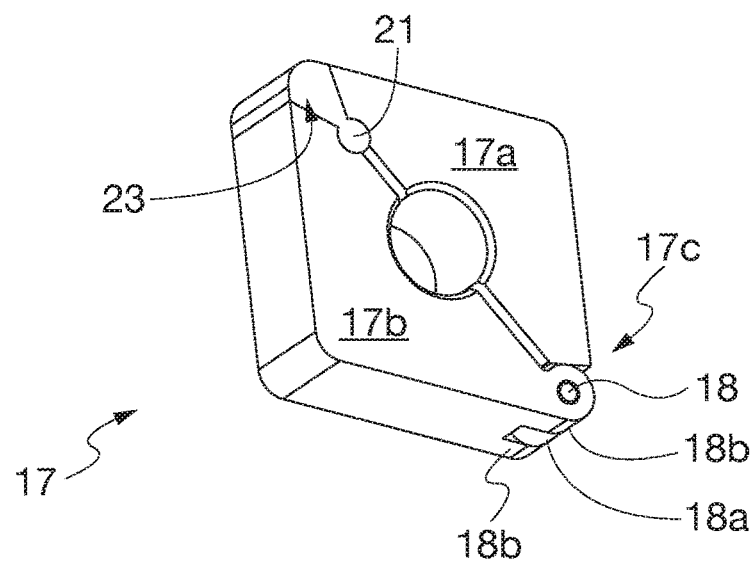
FIGS. 5A and 5B show a third embodiment of the retaining element in its closed configuration and in an exploded view, respectively.
Figure 5B:
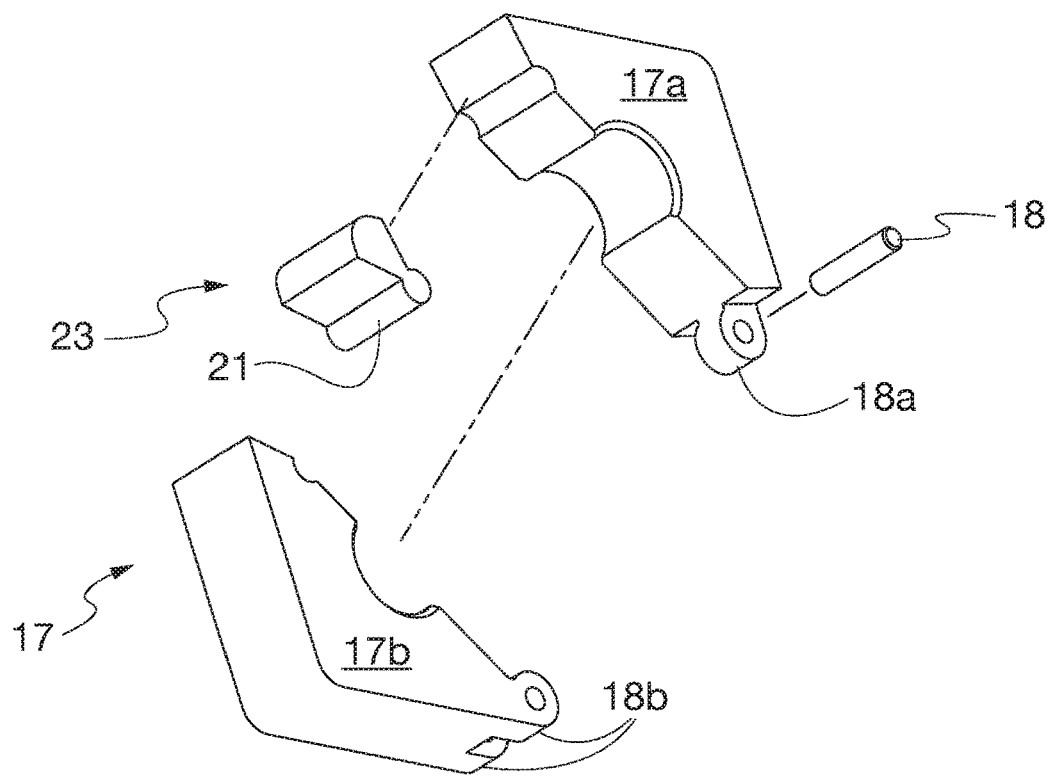

Referring to FIGS. 5A, 5B, there is illustrated a third embodiment of the retaining element 17. In this embodiment the retaining element 17 comprises a pair of jaws 17a,17b hinged to each other at an end 17c. At the opposite end there is situated the seat 19 for the engaging portion 21 of the tip 23. In the example shown, hinging is effected by means of a hinge pin 18 housed in corresponding hinges 18a,18b provided on the jaws and cooperating with each other. An elastic element (not shown), for instance a coil spring, can be provided around the pin 18 for keeping the jaws 17a,17b close to each other and hold the tip 23 in the seat 19 between the jaws 17a,17b as long as the retaining element 17 is free and has not yet been mounted in the device 11.

Figure 5C:
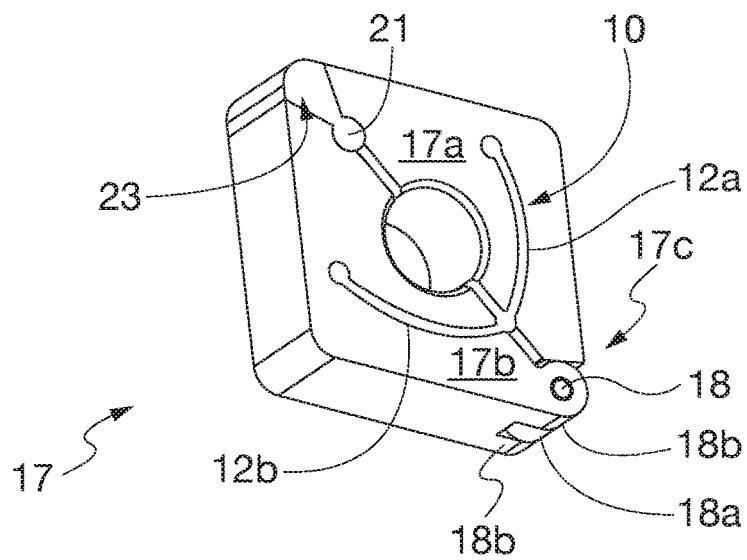
FIGS. 5C and 5D show the third embodiment of the invention in a variant provided with elastic element.
Figure 5D:
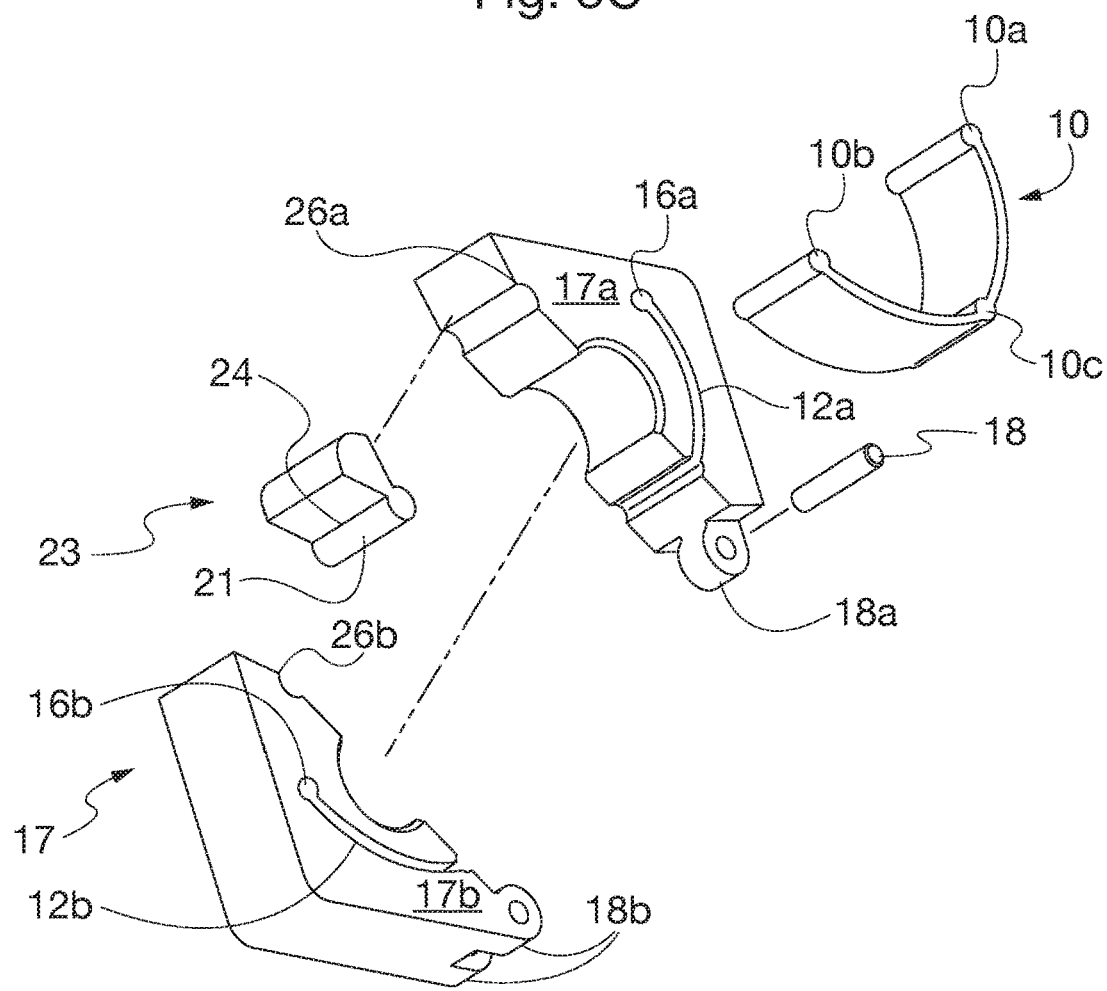

Referring to FIGS. 5C and 5D, there is illustrated the third embodiment in a variant with spring 10. Advantageously, according to this embodiment the two jaws 17a,17b hinged together around the pin 18 are kept close to each other by the spring 10 which exerts a restoring force for firmly retaining the tip 23 firmly within the seat 19 between the jaws 17a,17b.

Figure 6A:
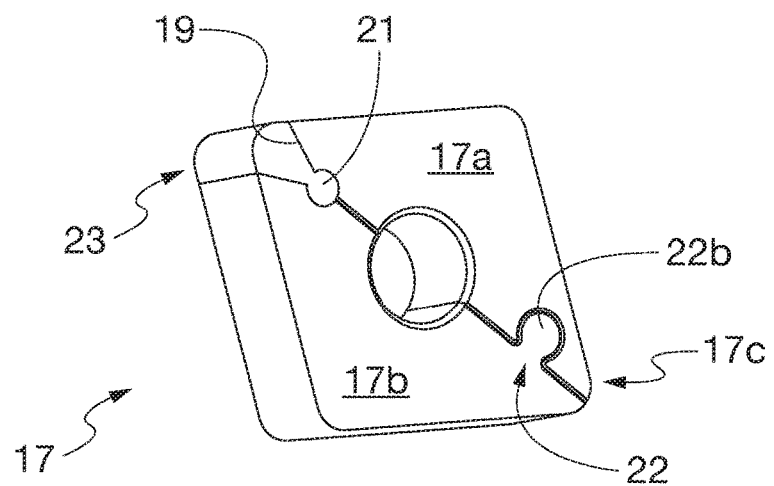
FIGS. 6A and 6B show a fourth embodiment of the retaining element in its closed configuration and open configuration, respectively.
Figure 6B:
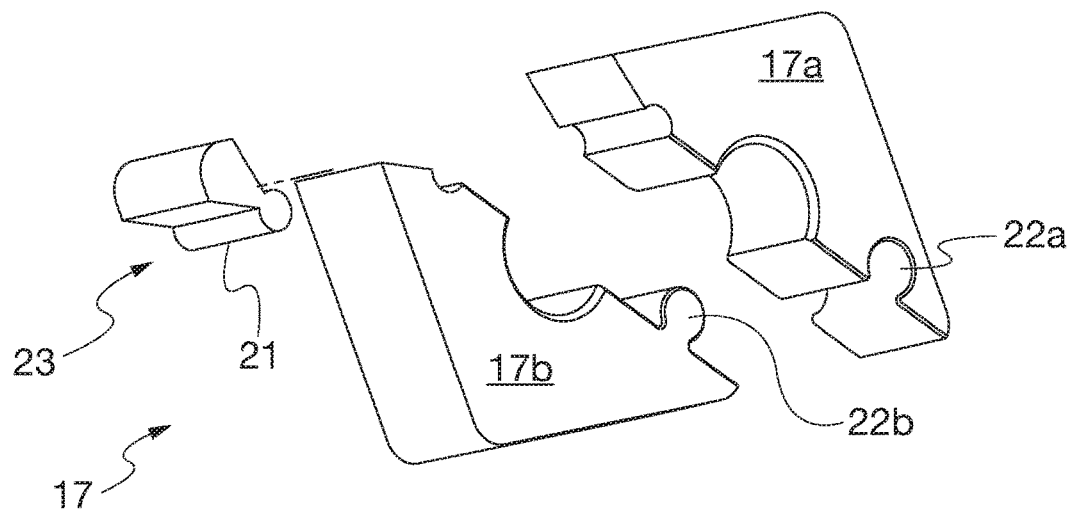

Referring to FIGS. 6A, 6B, there is illustrated a fourth embodiment of the retaining element 17. In this embodiment, the retaining element 17 comprises a pair of jaws 17a,17b reversibly connected to each other by means of corresponding engaging means 22 that are mutually cooperating. In the example shown, the connection between the jaws 17a,17b takes place by means of a male projection 22b provided on one of the jaws 17b and a female slot 22a provided in the other jaw 17a. The shape of the projection 22b and of the slot 22a is preferably such that the two jaws 17a,17b can be connected to each other and in case separated solely by means of a sliding movement along a plane perpendicular to the surface of the bases of the retaining element 17. The tip 23 can be inserted by snapping into the retaining element 17 with an insertion movement along a direction parallel to the bases of the retaining element 17. The snap insertion, brought about by the play between the slot 22a and the projection 22b as well as by the specific shape of the tip 23 and of the female seat 19 advantageously allows to firmly retain the tip 23 in the retaining element 17 before the latter is locked into the receiving part 15. The risk that the tip 23 slips out of the female seat 19 is therefore avoided and the mounting operation becomes easier and safer. Alternatively, the tip 23 during this sliding movement will be kept close against one of the jaws 17a,17b with the engaging portion 21 kept close to the corresponding part of the seat 19 until the two jaws become connected to each other and on the same plane.

The device according to the invention can house tips for machining of the kind employing chip removal of whatever materials, especially metals and plastics. The tip can further be ascribable to one of the shapes classified according to ISO norms or can also have other shapes.

The invention as described and illustrated is capable of several variants and modifications falling within the same inventive principle.

The invention claimed is:

1. A tool-holding device for a machining tool, comprising:
   a tool-holder body;
   a receiving part defined in the tool-holder body;
   a retaining element provided with a pair of mutually cooperating jaws;
   a female seat between said jaws for an engaging male portion of a machining tip, said jaws being capable of taking a locking configuration, in which the engaging portion of the tip is firmly locked within the seat of the retaining element, and a disengaged configuration in which said engaging portion of the tip can be detached from the retaining element;
   a moveable component which bears the main load of holding the retaining element in said receiving part when the retaining element is in the configuration in which it engages the tip,
   wherein the tip and the female seat are configured so as to allow a snap insertion into the locking configuration of the tip within the female seat along a direction parallel to the bases of the retaining element,
   wherein the retaining element includes an elastic element which comprises a spring made as a single piece having a horse-shoe-like or "V"-like or "U"-like shape and housed in a seat provided in the jaws.

2. The tool-holding device according to claim 1, wherein the snap insertion is made possible by a lateral contour of the tip, said contour comprising a pair of narrowed areas provided on lateral sides of the tip and cooperating with a pair of radial projections provided in the jaws in the seat.

3. The tool-holding device according to claim 1, wherein the jaws are resiliently connected to each other at a connection end of the retaining element, and wherein the female seat is provided between the jaws, at an end of the retaining element opposite to said connection end.

4. The tool-holding device according to claim 3, wherein the snap insertion is brought about by an elastic force of the connection end as well as by a shape of the tip and of the female seat, said elastic force causing retaining of the tip within the retaining element before the latter is locked in the receiving part of the device.

5. The tool-holding device according to claim 1, wherein the elastic element is arranged astride of the two jaws and provides an elastic return of the jaws towards each other.

6. The tool-holding device according to claim 1, wherein the jaws are separate bodies that are held together by the spring.

7. The tool-holding device according to claim 6, wherein the jaws are provided with corresponding arched seats comprising corresponding slots passing right through the jaws perpendicularly to the bases of the retaining element.

8. The tool-holding device according to claim 7, wherein the spring is provided with arched elastic strips connected at a base of the spring in a region of a thickened portion extending transversely and wherein thickened portions are also provided at opposite ends of the spring, said thickened portions having a substantially circular cross-section, and wherein the seats comprise widened portions for receiving the thickened portions.

9. The tool-holding device according to claim 1, wherein the jaws are hinged at a hinging end of the retaining element, and wherein the female seat is provided between the jaws, at an end of the retaining element opposite to said hinging end.

10. The tool-holding device according to claim 1, wherein the jaws are reversibly connected to each other by engaging means.

11. The tool-holding device according to claim 1, wherein the retaining element comprises a middle bore provided between the jaws for locking the retaining element in the receiving part.

12. The tool-holding device according to claim 1, wherein said moveable component comprises a cylindrical threaded pin which has a slightly eccentric upper part passing through a bore provided between the jaws of the retaining element and is engaged in a bore provided in the tool-holder body.

13. The tool-holding device according to claim 1, wherein the tool-holding device comprises a sub-plate between the retaining element and a base of the receiving part.

14. The tool-holding device according to claim 1, wherein side walls of the receiving part work as sliding surfaces for flanks of the retaining element and cause closing of the jaws of the retaining element, when said retaining element is retracted towards an inside of the receiving part.

15. A machining tool, comprising a retaining element provided with a pair of mutually cooperating jaws and a female seat between said jaws for a male engaging portion of a machining tip, said jaws being capable of taking a locking configuration, in which the engaging portion of the tip is firmly locked within the seat of the retaining element, and a disengaged configuration in which said engaging portion of the tip can be detached from the retaining element, wherein the tip and the female seat are configured so as to allow a snap insertion into the locking configuration of the tip within the female seat along a direction parallel to bases of the retaining element, wherein the jaws are resiliently connected at a connection end of the retaining element and the female seat is provided between the jaws at an end of the retaining element opposite to said connection end, wherein the snap insertion is brought about by an elastic force at the connection end as well as by shapes of the tip and the female seat, said elastic force causing retaining of the tip within the retaining element before the retaining element is locked in a receiving part of the machine tool, and wherein the retaining element includes an elastic element arranged astride of the two jaws and determining an elastic return of the jaws towards each other.

16. The machining tool according to claim 15, wherein the elastic element comprises a spring made as a single piece having a horse-shoe-like or "V"-like or "U"-like shape and housed in a seat provided in the jaws.

\* \* \* \* \*